(12) United States Patent
Park et al.

(10) Patent No.: US 9,408,084 B2
(45) Date of Patent: Aug. 2, 2016

(54) CONTROL METHOD FOR RADIATION BEAM DIRECTION OF WIRELESS TRANSMISSION DEVICE

(71) Applicant: Electronics and Telecommunications Research Institute, Daejeon (KR)

(72) Inventors: Ju-Derk Park, Daejeon (KR); Eun-Hee Kim, Daejeon (KR); Ho-Yong Kang, Daejeon (KR); Cheol-Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 98 days.

(21) Appl. No.: 14/284,670

(22) Filed: May 22, 2014

(65) Prior Publication Data

US 2015/0200451 A1    Jul. 16, 2015

(30) Foreign Application Priority Data

Jan. 16, 2014    (KR) ........................ 10-2014-0005700

(51) Int. Cl.
*H04B 1/38*    (2015.01)
*H04M 1/00*    (2006.01)
*H04W 16/28*    (2009.01)
*H04B 7/06*    (2006.01)
*H04W 64/00*    (2009.01)

(52) U.S. Cl.
CPC ............. *H04W 16/28* (2013.01); *H04B 7/0617* (2013.01); *H04W 64/006* (2013.01)

(58) Field of Classification Search
CPC ... H04W 16/28; H04W 64/00; H04W 64/003; H04W 64/006; H04B 7/0617; H04B 7/063

USPC .......... 455/436, 440, 441, 456.1, 63.4, 562.1, 455/121

See application file for complete search history.

(56) References Cited

U.S. PATENT DOCUMENTS

| | | | | |
|---|---|---|---|---|
| 5,890,067 A * | 3/1999 | Chang ................... | H04W 16/28 | 455/442 |
| 5,893,033 A * | 4/1999 | Keskitalo .............. | H04W 36/32 | 455/437 |
| 6,006,096 A * | 12/1999 | Trompower .......... | H04W 64/00 | 455/443 |
| 6,483,459 B1 * | 11/2002 | Hou ......................... | G01S 3/02 | 342/378 |
| 6,559,794 B1 * | 5/2003 | Nakajima .............. | G01C 21/20 | 342/357.31 |
| 6,731,954 B1 * | 5/2004 | Katz ..................... | H04W 16/28 | 342/367 |

(Continued)

FOREIGN PATENT DOCUMENTS

KR    10-2010-0070566 A    6/2010

*Primary Examiner* — Duc M Nguyen
(74) *Attorney, Agent, or Firm* — Rabin & Berdo, P.C.

(57) ABSTRACT

There is provided a control method for radiation beam direction of wireless transmission device in a method for controlling radiation beam for a mobile station considerably moving around in the wireless transmission device comprising: updating and storing movement data of moving position and moving direction of the mobile station every time it moves by receiving sensor data in the mobile station; calculating a moving point to move by using the stored movement data of the mobile station by the wireless transmission device; determining a sector zone of radiation beam emission for the moving point to move; and controlling radiation beam of the mobile station by using the sector zone for the determined radiation beam emission in the wireless transmission device.

7 Claims, 4 Drawing Sheets

(56) References Cited

U.S. PATENT DOCUMENTS

| | | | |
|---|---|---|---|
| 7,359,718 B2* | 4/2008 | Tao | G01S 5/0252 455/414.1 |
| 8,405,567 B2 | 3/2013 | Park et al. | |
| 8,462,663 B2* | 6/2013 | Dahl | G01S 5/0081 370/254 |
| 2004/0087316 A1* | 5/2004 | Caci | G01C 21/20 455/456.1 |
| 2006/0038719 A1* | 2/2006 | Pande | G01S 5/0027 342/357.64 |
| 2006/0189355 A1* | 8/2006 | Cuffaro | H04B 7/04 455/562.1 |
| 2006/0211430 A1* | 9/2006 | Persico | G01S 5/0263 455/456.1 |
| 2007/0142089 A1* | 6/2007 | Roy | H04B 7/0848 455/562.1 |
| 2011/0028099 A1* | 2/2011 | Cohen | H04W 40/18 455/63.4 |
| 2011/0207489 A1* | 8/2011 | DeLuca | H04W 72/1205 455/509 |
| 2013/0039217 A1 | 2/2013 | Cordeiro | |
| 2013/0259005 A1 | 10/2013 | Kulkarni | |
| 2015/0094100 A1* | 4/2015 | Opshaug | H04W 64/003 455/456.5 |

* cited by examiner

CONTROL METHOD FOR RADIATION BEAM DIRECTION OF WIRELESS TRANSMISSION DEVICE

CROSS REFERENCE TO RELATED APPLICATION

This application claims the benefit of Korean Patent Application No. 10-2014-0005700, filed on Jan. 16, 2014, entitled "Control method for radiation beam direction of wireless transmission device", which is hereby incorporated by reference in its entirety into this application.

BACKGROUND OF THE INVENTION

1. Technical Field

The present invention relates to a method for controlling direction between a mobile wireless transmission device equipped with a direction control antenna and a fixed wireless transmission device.

2. Description of the Related Art

An omni-directional antenna is generally used as a base station antenna in a mobile communication system to radiate or receive signals equally regardless of direction.

All signals transmitted or received to an antenna are transmitted or received by controlling power according to the distance to a transmission/reception antenna of a base station and interference is caused to transmitted or received desired signals. Thus, an antenna of a base station cannot selectively transmit or receive signals.

Therefore, a cell is divided into several sectors and several antennas are used to reduce such interferences. For example, when a cell is divided into 3 sectors and 3 antennas are used, each antenna is responsible for 120° which is able to reduce the interference by ⅓.

Furthermore, an antenna can be fixed to provide higher gain for the signals transmitted or received from a predetermined angle and provide less gain for the interference signals transmitted or received from different directions in order to reduce the interference. However, this method can be efficient when a receiver/transmitter is fixed.

A smart antenna system is able to selectively transmit or receive signals of a desired direction to minimize interferences and thus significantly reduce interferences between subscribers. That is, an independent beam is provided to each terminal in a cell for receiving and transmitting and beam is provided to a desired terminal so that volume of radiation can be minimized to other direction terminals.

Such a smart antenna system is also able to minimize interfering noises between traffic channels to improve call qualities. The smart antenna system is also able to provide radio wave to a desired direction so that each terminal is allowed for communications in low power.

An optimized beam forming technique is to build an array antenna in a base station to provide independently optimum weight to each subscriber.

Applications of a low power wireless transmission system become diversified and its structure and functions are also simplified. While processing capacities, functions and performances of a conventional mobile communication terminal increase, functions of a communication module such as a wireless transmission device for sensor network, internet of things (IoT) and so on are becoming simplified and low-power consumed.

When a mobile station moves around a fixed station which is able for direction control and communication between these wireless stations (between the mobile station and the fixed station) is made, the fixed station should control the direction according to the movement of the mobile station.

US 2013-0259005 discloses that a fixed station controls direction when a mobile station moves around.

US 2013-0259005 teaches that when RSSI (Received signal strength indicator) values between two terminals are compared, emission zone with higher value is selected.

Even though time required for conversion or on/off of the emission zone is short, when connection between two wireless stations gets disconnected, data exchange to exchange necessary information may not be possible for the time required for reconnection. Thus, a method for reducing reconnection process is demanded.

PRIOR ART

US Patent Publication No 2013-0259005 (Controlled Client Roaming)

SUMMARY OF THE INVENTION

An object of the present invention is to provide a method for controlling radiation beam direction of a transmission device which can predict and transmit moving direction by utilizing information about moving position and moving direction of a mobile station.

According to an aspect of the present invention, there is provided a control method for radiation beam direction of a wireless transmission device in a method for controlling radiation beam for a mobile station considerably moving around in the wireless transmission device comprising: updating and storing movement data of moving position and moving direction of the mobile station every time it moves by receiving sensor data in the mobile station; calculating a moving point to move by using the stored movement data of the mobile station by the wireless transmission device; determining a sector zone of radiation beam emission for the moving point to move; and controlling radiation beam for the mobile station by using the sector zone for the determined radiation beam emission in the wireless transmission device In the step of calculating a moving point to move, the movement data may comprise moving angles and moving velocities of previous 3 points from each point where the mobile station has moved.

The step of calculating a moving point to move may comprise calculating a moving angle and a moving velocity of a current point using the following Equation 1 by utilizing moving angles and moving velocities of previous 3 points from each point where the mobile station has moved, $$\theta_n = \theta_{n-1} + (\theta_{n-2} - \theta_{n-3}),\ V_n = V_{n-1} + (V_{n-2} - V_{n-3}) \qquad \text{Equation 1}$$

wherein, $\theta_n$ and $V_n$ are the moving angle and the moving velocity calculated at a current point, respectively, $\theta_{n-1}$, $V_{n-1}$ $\theta_{n-2}$, $V_{n-2}$, $\theta_{n-3}$, $V_{n-3}$ are moving angles and moving velocities of previous 3 points from each point where the mobile station has moved, respectively.

The step of calculating a moving point to move may further comprise calculating a point to move by using the moving angle and the moving velocity calculated at a current point.

The step of determining a sector zone for the radiation beam emission may comprise, after calculating the point of the mobile station to move, determining if the point to move is included in a directional sector zone or an omni directional sector zone.

The step of determining a sector zone for the radiation beam emission may comprise, after calculating the point of the mobile station to move, selecting preferentially an omni directional emission zone when the point to move is included in both a directional sector zone and an omni directional sector zone.

The step of controlling radiation beam may comprise emitting radiation beam in advance to the direction of the sector in which the point to move is included while maintaining the direction of the sector of the zone where the current point is included The step of controlling radiation beam may comprise, when the point of the mobile station to move is determined, controlling radiation beam of the sector, where the mobile station is previously included, to be turned off.

According to an embodiment of the present invention, a wireless transmission system providing services while moving around a particular area can expand service zones and improve communication qualities with control of radiation emission direction.

When a wireless transmission device moving a zone which is divided into sectors moves to another sector, problems associated with disconnection can be solved so that the time required for reconnection can be reduced and reliability for spatial information acquisition in service zones can be increased by utilizing predicted moving points in advance.

DESCRIPTION OF THE EXEMPLARY EMBODIMENTS

The present invention will be described in more detail with reference to particular embodiments and it is to be appreciated that various changes and modifications may be made.

However, the exemplary embodiments disclosed in the present invention and the accompanying drawings do not limit the scope of the present invention. The scope of the present invention should be interpreted by the following claims and it should be interpreted that all spirits equivalent to the following claims fall within the scope of the present invention. Throughout the description of the present invention, when describing a certain technology is determined to evade the point of the present invention, the pertinent detailed description will be omitted.

While such terms as "first" and "second," etc., may be used to describe various components, such components must not be limited to the above terms. The above terms are used only to distinguish one component from another.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, the present invention will be described in detail with reference to the accompanying drawings.

Figure 1:
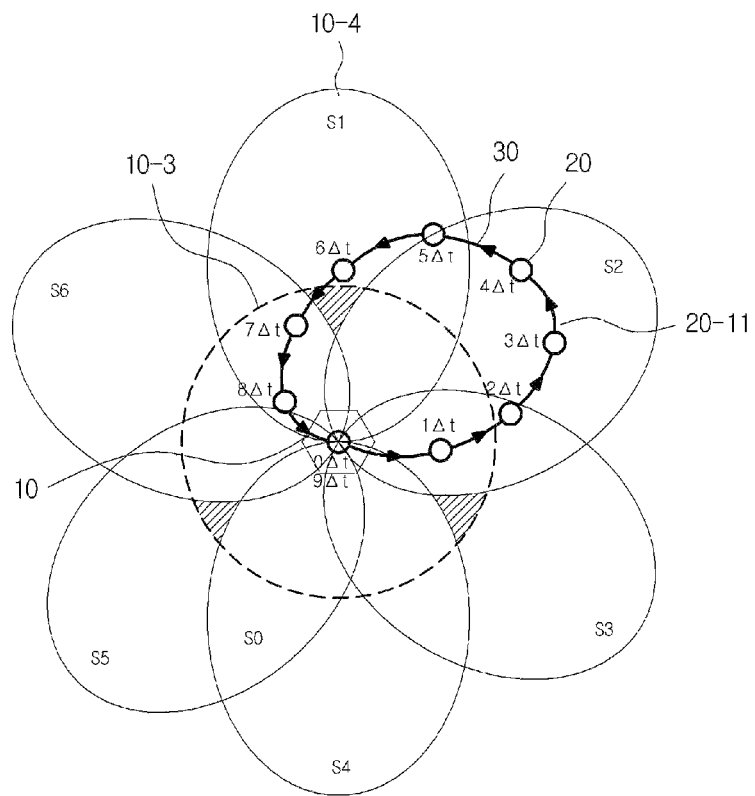
FIG. 1 illustrates communication service zones between a fixed station and a mobile station.

FIG. 1 illustrates communication service zones between a fixed station and a mobile station.

FIG. 1 illustrates emission zones when a mobile wireless transmission device 20 (hereinafter referred to as 'mobile station') moves considerably around a fixed wireless transmission device for control 10 (hereinafter referred to as 'fixed station') with a special movement path 30.

The fixed station 10 is fixed on a particular position and an antenna provided thereon supports an omni directional emission zone 10-3 and a directional emission zone 10-4.

The omni directional emission zone 10-3 of the present invention is defined as $sector_0$ and the directional emission zone 10-4 is defined as $sector_n$, $sector_{n+1}$, $sector_{n+2}$, ... (n is a natural number other than 1).

The mobile station 20 detects front direction at a current position in $\Delta t$ intervals (20-11) and moves along with a special movement path 30.

A communication service zone between two wireless transmission devices having no direction control is limited to $sector_0$ 10-3 which is the omni directional emission zone. On the other hand, when the fixed station 10 and the mobile station 20 are involved for direction control, the communication service zone may be the area from $sector_1(S1)$ to $sector_6(S6)$.

When the mobile station 20 moves to the zone which supports the directional emission zone by exceeding the omni directional emission zone (for example, movement for time between $1\Delta t$ and $2\Delta t$), the fixed station 10 should turn the emission direction from $sector_0(S0)$ which is the omni directional emission zone to $sector_2(S2)$ direction.

When the mobile station 20 moves to or through the directional emission zone boundary (for example, movement for time between $4\Delta t$ and $5\Delta t$), the emission direction should be turned from the $sector_2(S2)$ to the $sector_1(S1)$ direction.

As such, when the emission zone, which is supported by the fixed station 10, changes by the movement of the mobile station 20, the wireless transmission device for control should control the emission direction.

When the mobile station 20 moves from the directional emission zone to the overlapping zone of another directional emission zone and the omni directional emission zone (for example, movement for time between $6\Delta t$ to $7\Delta t$), a sector from the $sector_0(S0)$ and the $sector_6(S6)$ should be selected.

In an embodiment of the present invention, the $sector_0(S0)$, which is the 에서는 omni directional emission zone, is selected. This is able to prevent extreme sector changes of the emission zone when it moves a short distance.

As described above, information to predict moving position and moving direction of the mobile station 20 is needed for the fixed station 10 to control the emission direction.

In an embodiment of the present invention, the fixed station 10 updates moving position and moving direction of the mobile station 20 every time it moves by receiving sensor data in the mobile station 20 in order to predict moving position and moving direction of the mobile station 20.

The fixed station 10 predicts emission direction by using the updated movement data of the mobile station and uses it to control emission direction.

Figure 2:
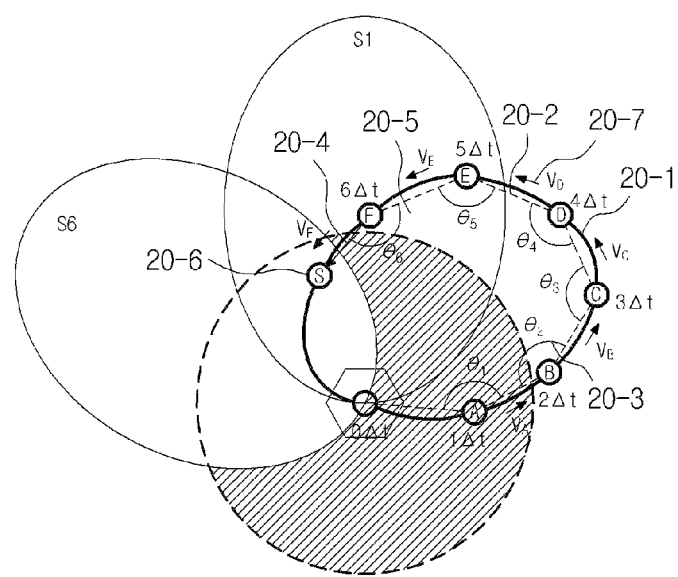
FIG. 2 illustrates moving paths and angles of a mobile station according to an embodiment of the present invention.

FIG. 2 illustrates moving path and angle of a mobile station according to an embodiment of the present invention.

Referring to FIG. 2, when the mobile station 20 is located in a F point, an angle $\theta_6'(20-5)$ with next path should be predicted in order to predict the next path (20-4) and this angle may be calculated by the analogy of angles $\theta_5$, $\theta_4$, $\theta_3$ and so on of previous moving positions E, D, C and so on.

Figure 3:
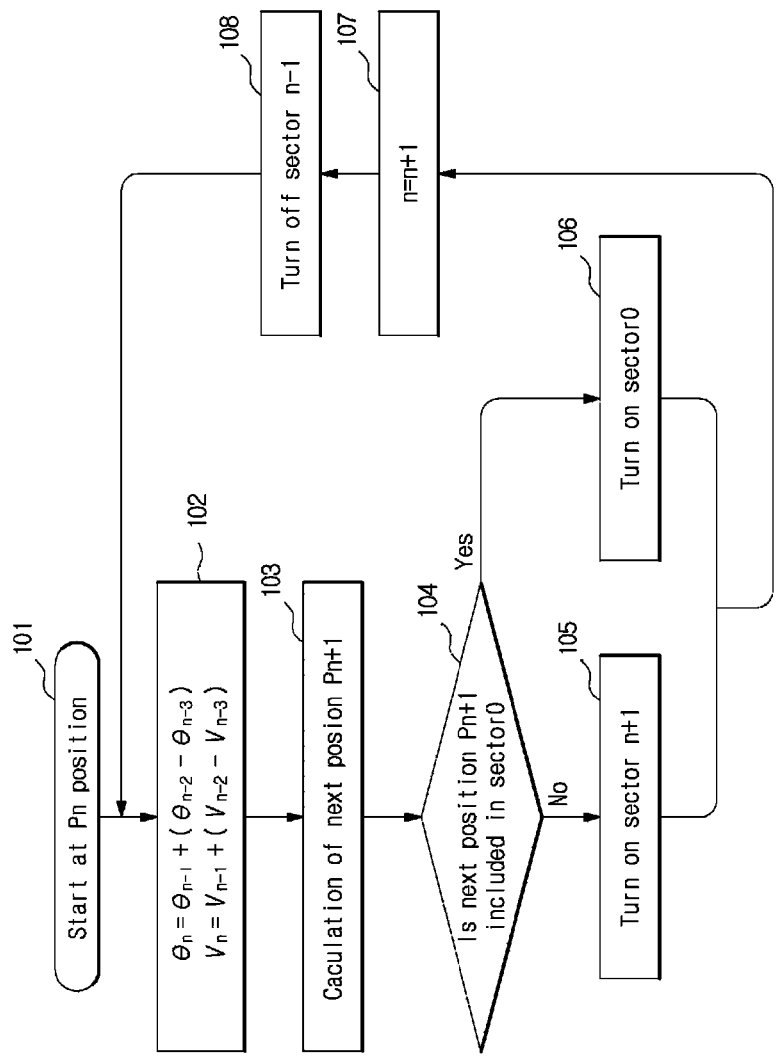
FIG. 3 is a flowchart illustrating a method for predicting moving path of a mobile station according to an embodiment of the present invention.

FIG. 3 is a flowchart illustrating a method for predicting moving path of a mobile station according to an embodiment of the present invention.

$P_n$ is the position at n moving time, $\theta_n$ and $V_n$ are moving angle and moving velocity, respectively, at $P_n$ position, $sector_0$ is an omni directional emission zone, and $sector_{n+1}$ is a predicted position at next time which is a directional emission zone where $P_{n+1}$ is expected to be belonged.

According to an embodiment of the present invention, the angle $\theta_6'$ (20-5) is calculated by utilizing previous angles of $\theta_5$, $\theta_4$, $\theta_3$ and so on at the positions of E, D, C and so on.

The velocity (20-7) between the moving positions may be also calculated by utilizing changes in the previous positions.

Referring to FIG. 3, moving angle and moving velocity which is moving path at a current position of the mobile station may be calculated by using the following Equation 1 in Step 102.

Equation 1 is an operation to predict an angle and a velocity by considering moving path of the mobile station according to an embodiment of the present invention.

$$\theta_n = \theta_{n-1} + (\theta_{n-2} - \theta_{n-3}),\ V_n = V_{n-1} + (V_{n-2} - V_{n-3}) \qquad \text{Equation 1}$$

The moving angle $\theta_6'$ and the moving velocity $V_F$ at the F position, which is the current position ($P_n$) in FIG. 2, may be calculated by employing Equation 1.

$$\theta_6' = \theta_5 + (\theta_4 - \theta_3),\ V_F = V_E + (V_D - V_C)$$

According to an embodiment of the present invention, the moving angle $\theta_6'$ and the moving velocity $V_F$ at F position of the mobile station 20 may be predicted by utilizing moving angles and moving velocities at 3 previous positions.

After calculating the moving angle($\theta_6'$) and the moving velocity ($V_F$) at F position, G position, which is the next position ($P_{n+1}$), may be predicted by utilizing the moving angle($\theta_6'$) and the moving velocity ($V_F$) at F position in Step 103.

After the G position is calculated, it may be determined if the zone where G is included is the next sector (S6) zone or the $sector_0$(S0) zone which is the omni directional emission zone in Step 104.

When it is determined that the zone where G is included is the next sector (S6) zone, the fixed station 10 maintains the direction of the sector of the zone, where the current position F is included, and controls the antenna of the next sector, $sector_{n+1}$, direction to turn on to generate a directional beam in Step 105

On the other hand, when it is determined that the zone where G is included is the $sector_0$(S0) zone which is the omni directional emission zone, the fixed station 10 maintains the direction of the sector of the zone, where the current position F is included, and controls the antenna of the $sector_0$, which is the omni directional emission zone, direction to turn on to generate a directional beam in Step 106

The mobile station 20 may then move to the next moving position ($P_{n+1}$) in Step 107.

After checking that the mobile station 20 has moved to the next moving position ($P_{n+1}$), the antenna directing to $sector_{n+1}$ may be controlled to be turned off in Step 108.

According to an embodiment of the present invention, the fixed station 10 emits radiation beam in advance to the direction of the next sector while maintaining the direction of the sector of the zone where the current F position is included to continuously maintain the connection between two wireless communication stations.

In an embodiment of the present invention, when the next position ($P_{n+1}$) is included in both of the next sector (sector 6) zone and the $sector_0$ which is the omni directional emission zone, it may be programmed to select preferentially the $sector_0$ which is the omni directional emission zone.

When the mobile station 20 approaches closer to the fixed station 10, since change in sector may be higher than that in distance, it may be programmed to select preferentially the $sector_0$ which is the omni directional emission zone to prevent extreme changes in sector.

In an embodiment of the present invention, a wireless communication system providing services by moving around a particular zone may expand service zones and improve communication qualities by controlling radiation emission direction.

According to an embodiment of the present invention, when a wireless communication device moving a zone, which is divided into sectors, moves to another sector through controlling direction, it may solve problems associated with disconnection, reduce the time required for reconnection and increase reliability for spatial information acquisition in service zones by utilizing predicted moving positions in advance.

Use of the present invention allows communication services in much wider zones with limited resources (frequency bandwidth, radiation intensity) by applying to wireless communication services in the fields of sensor network system and internet of things (IoT).

Figure 4:
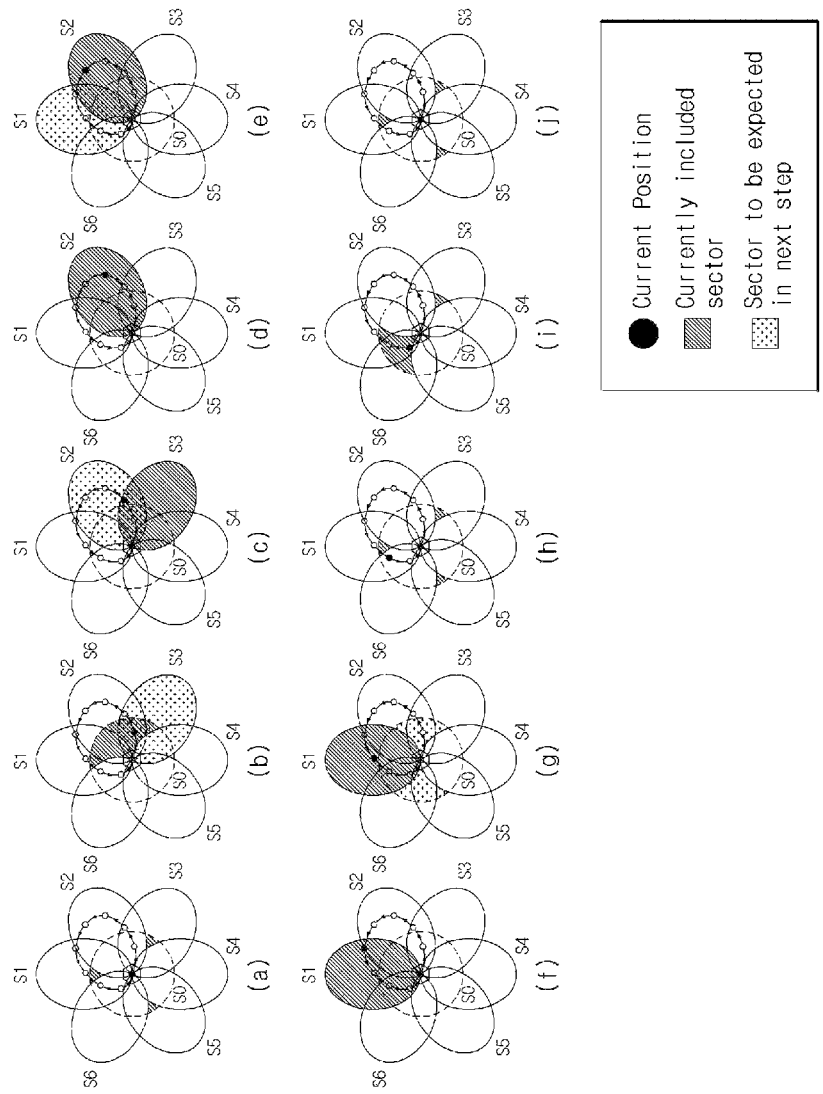
FIG. 4 illustrates examples of emission zone at each point and emission zone which is expected for next entry.

FIG. 4 illustrates examples of emission zone at each point and emission zone which is expected for next entry.

Referring to FIG. 4, change in emission zones at each moving position is in an order of $sector_0$, $sector_0$, $sector_3$, $sector_2$, $sector_2$, $sector_1$, $sector_1$, $sector_0$, $sector_0$, $sector_0$ and the emission zone at next expected position from each moving position is in an order of $sector_3$, $sector_2$, $sector_2$, $sector_1$, $sector_1$, $sector_0$, $sector_0$, $sector_0$, $sector_0$, $sector_0$.

DESCRIPTION OF REFERENCE NUMERALS

10: Fixed station
20: Mobile station

What is claimed is:

1. A control method for controlling a direction of a radiation beam of a wireless transmission device for a mobile station considerably moving around the wireless transmission device, comprising:
    updating and storing movement data, which include a position and a moving direction of the mobile station, every time the mobile station moves by receiving sensor data from the mobile station;
    calculating a moving angle and a moving velocity of the mobile station at a current position using the stored movement data, including
    ascertaining, using the stored movement data, first, second and third positions that are immediately prior to the current position, the mobile station sequentially moving through the third, second and first positions to reach the current position,
    calculating the moving angle using a moving angle of the mobile station at the first position and a difference between moving angles of the mobile station at the second and third positions, and
    calculating the moving velocity using a moving velocity of the mobile station at the first position and a difference between moving velocities of the mobile station at the second and third positions;

determining a sector zone of emission of the radiation beam in accordance with the calculated moving angle and moving velocity; and controlling the direction of the radiation beam using the determined sector zone.

2. The control method of claim 1, wherein calculating the moving angle includes adding the moving angle of the mobile station at the first position and the difference between the moving angles of the mobile station at the second and third positions, and calculating the moving velocity includes adding the moving velocity of the mobile station at the first position and the difference between the moving velocities of the mobile station at the second and third positions.

3. The control method of claim 1, wherein the step of determining a sector zone includes calculating a next position to which the mobile station moves using the moving angle and moving velocity calculated at the current position, and determining the sector zone using the next position.

4. The control method of claim 3, wherein the step of determining the sector zone using the next position comprises determining if the next position is included in a directional sector zone or an omni-directional sector zone.

5. The control method of claim 3, wherein the step of controlling the direction of the radiation beam comprises controlling emission of the radiation beam to a sector zone in which the mobile station is previously included to be turned off after the determination of the next position.

6. The control method of claim 1, wherein the step of controlling the direction of the radiation beam comprises emitting the radiation beam in advance to a direction of the determined sector zone while maintaining a current direction, which is a direction of a sector zone in which the current position is included.

7. A control method for radiation beam direction of a wireless transmission device in a method for controlling radiation beam for a mobile station considerably moving around in the wireless transmission device, comprising:

updating and storing movement data of moving position and moving direction of the mobile station every time it moves by receiving sensor data in the mobile station;

calculating a moving point to move by using the stored movement data of the mobile station by the wireless transmission device;

determining a sector zone of radiation beam emission for the moving point to move; and controlling radiation beam for the mobile station by using the sector zone for the determined radiation beam emission in the wireless transmission device, wherein the step of determining a sector zone for the radiation beam emission comprises, after calculating the point of the mobile station to move, selecting preferentially an omni-directional emission zone when the point to move is included in both a next directional sector zone and an omnidirectional sector zone.

* * * * *